United States Patent [19]

Wadleigh

[11] 4,050,650
[45] Sept. 27, 1977

[54] SYNCHRONATED INDEX FILM DRIVE MECHANISM

[76] Inventor: Edward R. Wadleigh, Star Route Box 279, Hemet, Calif. 92343

[21] Appl. No.: 646,708

[22] Filed: Jan. 5, 1976

[51] Int. Cl.² .................. G03B 23/12; G03B 1/04; G11B 15/32
[52] U.S. Cl. .................. 242/206; 353/26 R; 226/110
[58] Field of Search .................. 242/180, 205, 206; 226/109, 110; 352/31, 33, 92; 40/28.3, 86 R, 86 A, 95, 106.1; 353/26 R, 26 A

[56] References Cited

U.S. PATENT DOCUMENTS

| 1,873,342 | 8/1932  | Serrurier ............... 352/31 |
| 2,343,850 | 3/1944  | Fairbanks et al. ........ 242/205 |
| 2,911,882 | 11/1959 | Hicks .................... 352/31 |
| 3,597,070 | 8/1971  | Slettebo ................ 353/26 R |
| 3,743,157 | 7/1973  | Mason ................ 242/206 X |
| 3,751,152 | 8/1973  | Rinehart ............... 353/26 A |

Primary Examiner—Leonard D. Christian
Attorney, Agent, or Firm—Sughrue, Rothwell, Mion, Zinn and Macpeak

[57] ABSTRACT

A data film capstan about which a high speed data microfilm is wrapped is directly mechanically linked by a gear speed reduction mechanism to an index film capstan having an index film wrapped thereabout for driving the index film in synchronism and at a predetermined reduced speed for easy index data viewing.

6 Claims, 2 Drawing Figures

SYNCHRONATED INDEX FILM DRIVE MECHANISM

BACKGROUND OF THE INVENTION

1. Field of the Invention

This invention relates to the synchronous movement of an index film at a speed slow enough to visually ascertain its content in conjunction with a high speed data microfilm, and more particularly, to a direct mechanical drive responsive to data film movement.

2. Description of the Prior Art

A roll of microfilm or the like contains voluminous amounts of data with a single roll containing in excess of 100,000 pages of data which may be readily optically displayed by locating a particular page by high speed movement of the microfilm, termination of film movement and optical projection of that data. The data film itself travels so fast that it is impossible for the operator in moving the film to read any component of the data pages as they are flashed on the screen of the viewing element of the projection system during such movement. Conventionally, it is necessary for the operator to stop the data film near an expected point relative to the selected page or pages of data and ascertain whether, by hit or miss, he must then index the microfilm forward or rearward from that point and repeat the process in narrowing multiple steps as he nears a selected page.

Attempts have been made to provide on a separate film, index data and to synchronize movement of the index film at a much slower speed with that of the moving data film, so that the operator simply monitors the movement of the slow speed index film and stops the movement of the data film at the desired position.

To achieve such synchronism, optical marks have been placed in one or both films and a comparison made by optical comparing means of the position of the data film relative to the index film moving at the slower speed. However, the optical comparison means increases the cost of the microfilm viewer, complicates the system, and increases the size of the unit by the addition of the comparison means.

SUMMARY OF THE INVENTION

The present invention is directed to the employment of a direct mechanical linkage between the data microfilm and the index film including a speed reduction mechanism to effect driving of the index film at a proportionately slower speed than that of the data microfilm.

Specifically, the microfilm is carried by and driven between a pair of reels which are motor driven to effect selectively movement of the microfilm bidirectionally between the reels. The microfilm is trained about the periphery of a drive capstan, a mechanical gear reduction unit couples the drive capstan bearing the microfilm to an index film capstan about whose periphery the index film is trained, such that the microfilm directly drives the index film at a predetermined reduced speed depending upon the gear reduction ratio. The data microfilm and the index film may be sprocketed and the drive and driven capstans may be provided with sprocket teeth on their peripheries engaging the sprocket holes within respective films to effect positive movement of the index film in response to data microfilm movement. Alternatively, either film may be non-sprocketed and the capstan in contact therewith either drives the film frictionally or is driven thereby with the film sandwiched between the capstan and a spring loaded pinch roller to insure frictional contact of the film with the periphery of the capstan.

DESCRIPTION OF THE PREFERRED EMBODIMENTS

Figures 1, 2:
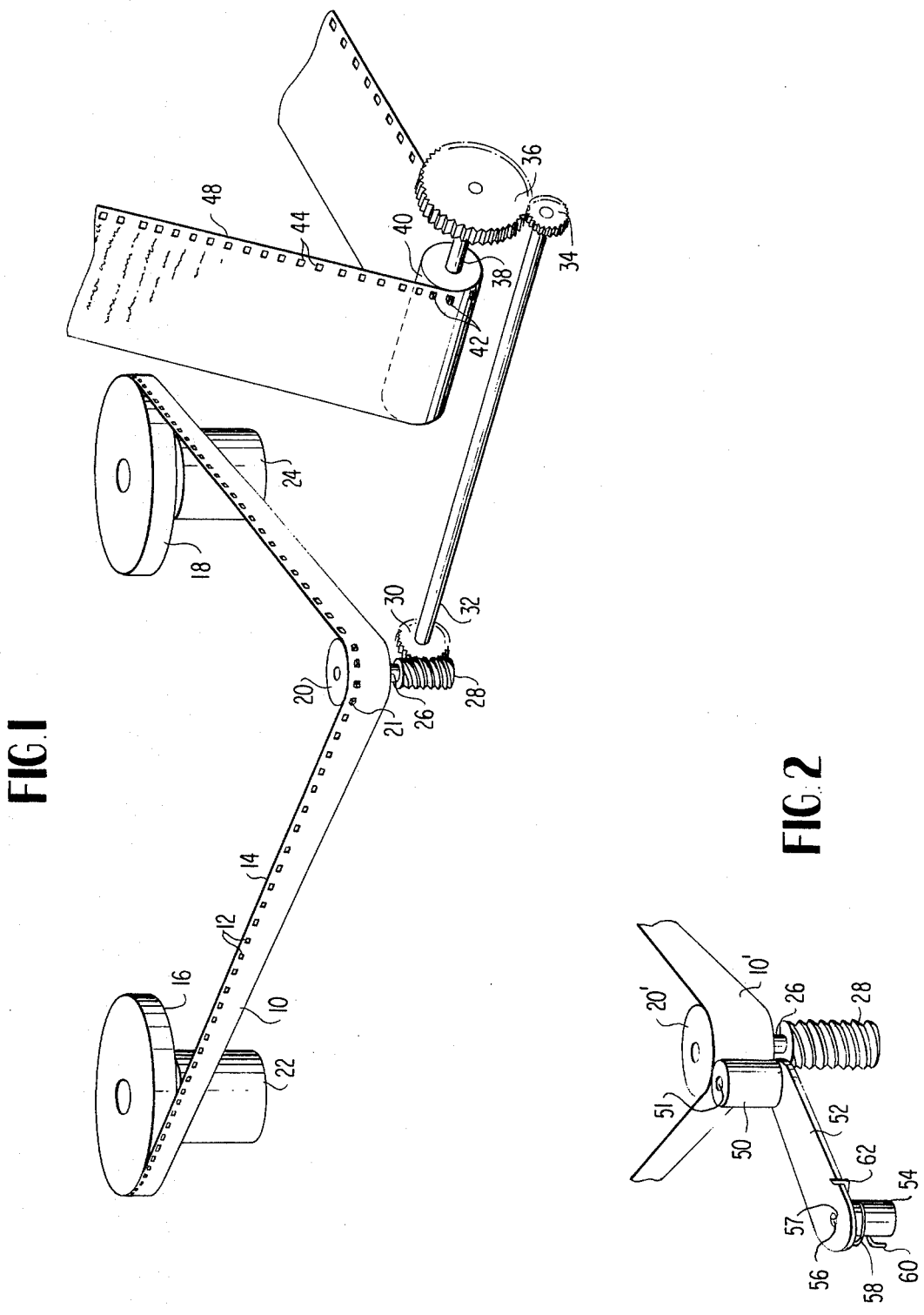
FIG. 1 is a perspective view of a simplified form of the index film transmission system of the present invention.
FIG. 2 is a perspective view of a portion of a modified form of the index film transmission system similar to that of FIG. 1.

Reference to FIG. 1 illustrates a preferred embodiment of the present invention as applied to a microfilm viewer, in which only the microfilm 10 and its drive system are shown, the other components of the microfilm viewer such as the optical projection system purposely not being shown since they do not relate to the present invention. The film 10 is of the sprocketed type containing a single longitudinal series of sprocket holes as at 12 adjacent the upper edge 14, the film 10 being mounted for movement between a supply reel 16 and a take up reel 18 and being trained about a data film capstan 20 bearing sprocket teeth 21 on its periphery. In order to effect movement of the data microfilm 10 between reels, each reel is mounted for rotation about a vertical axis. In this case, each reel is directly driven by a drive motor; the supply reel 16 being driven by motor 22 and the take up reel 18 being driven by drive motor 24. The motors 22 and 24 are selectively energized so as to effect movement of the sprocketed data microfilm 10 in either direction. The effect of motor operation is to indirectly drive the capstan 20, that is, rotate the capstan 20 about a vertical axis corresponding to that of shaft 26. The capstan 20 is mounted for rotation about the axis of shaft 26 by means (not shown), the shaft 26 terminating at its lower end in a worm gear 28. The worm gear 28 is in direct mesh with a worm wheel 30 which is fixed at one end to a transmission shaft 32 which extends at right angles to the axis of shaft 26, and terminates on its opposite end in a drive pinion 34 of spur gear type, the shaft 32 being supported for rotation about its axis by means (not shown). The drive pinion 34 is of relatively small diameter and is in direct mesh with a driven spur gear 36 which rotates about a horizontal axis as defined by an index capstan drive shaft 38 which extends parallel to the transmission shaft 32 and is supported by means (not shown). Shaft 38 bears on the end opposite the driven gear 36, an index film capstan or roller 40 whose periphery is provided with a plurality of sprocket teeth 42 which directly engage the sprocket holes 44 of a sprocketed index film or belt 46, only a portion of which is shown. The index film or belt 46 bears in addition to the sprocket holes 44, various lines of index data 48 for direct viewing by the operator of the microfilm viewer. The diameter of the data film capstan 20 and that of the index film capstan 40 as well as the size of the various gears 28, 30, 34 and 36 are selected such that the speed of movement of the index film 46 relative to the data microfilm 10 is at a predetermined ratio, for instance, the ratio of 1 to 100, to insure that the movement of the index film is sufficiently slow such that the index information or data 48 may be readily easily read by the operator of the machine. At the same time, it is impossible to visually ascertain the content of any of the film displayed by the film viewer by way of its projection apparatus from the much faster moving data microfilm 10. Thus, rather than a hit or miss attempt at stopping either drive motor 22 or drive motor 24, depending upon the direction of movement of the data microfilm 10, the operator knows by glancing at the index film 46 the exact content of the microfilm relative to the projection apparatus and simply stops the microfilm at a desired display point.

By reference to FIG. 2, wherein like elements carry like numerical designations, there is illustrated a modified form of the invention in terms of the utilization of a film which is unsprocketed, that is, the film does not carry sprocket holes. In this case, the direct mechanical linkage between the surface of the data microfilm and the surface of the index film to achieve synchronous movement of the index film at a slower speed is achieved, at least partially, by frictional drive at the point of contact of the capstan with respect to film. In this respect, a data microfilm capstan 20' similar to the capstan 20 of FIG. 1, is employed. However, in this case, it does not include the sprocket teeth 21 and, further, the data microfilm 10' is likewise void of the sprocket holes of the prior embodiment. Capstan 20' is mounted for rotation about a vertical axis by means of shaft 26 which mounts at its lower end the worm gear 28 similar to the prior embodiment. The means for mounting the shaft 26, the worm gear 28, and the capstan 20' for rotation about a vertical axis in similar fashion to the prior embodiment is not shown. In order to maintain frictional engagement between the data microfilm 10' and the periphery of the data film capstan 20', a pinch roller 50 is rotatably mounted at one end of arm 52. The roller 50 is appropriately mounted for rotation on a fixed upstanding pin (not shown) received by bore 51 within the pinch roller. In turn, the arm 52 is mounted for rotation on a fixed cylindrical post 54 by way of small diameter post extension 56 which extends through a circular opening 57 within arm 52 on the end opposite that holding the roller 50. In order to bias the pinch roller 50 against the data microfilm 10', a coil spring 58 is wrapped about post 54 and has one end 60 fixed by means (not shown) while the other end 62 engages a lateral edge of the arm 52, and thus in the case of FIG. 2, biases the pinch roller 50 against the surface of the microfilm 10' and prevents slipping of the microfilm 10' with respect to the data film capstan 20' as it frictionally drives capstan 20'.

While not shown, the same frictional drive may be employed for the index film in the modified embodiment of the invention, that is, in this case, instead of the roller 40 having sprocket teeth as 42 and engaging the sprocket holes within the index film 46, the index film is non-sprocketed, and the roller or index capstan 40 is in frictional engagement with the index film, and the index film is pressed thereagainst by a similar spring biased pinch roller to that illustrated at 50 in FIG. 2. While the index material comprises a film and particularly an endless film, obviously, the index material may be formed of a material other than photographic film such as paper and the like.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a microfilm viewer or the like including:
    a data microfilm,
    means for moving said data microfilm at relatively high speed for selective data projection upon stoppage of said moving means,
    the improvement comprising:
    an index film mounted within said viewer for movement, said index film carrying index data corresponding to the microfilm data and adapted for viewing during movement of said index film, and
    speed reduction mechanical drive means linking the surfaces of respective films wherein, the microfilm directly drives the index film at a speed slower than said speed of microfilm movement thereby permitting index data on said index film to be visibly read during movement of said microfilm and index film.

2. The microfilm viewer as claimed in claim 1, wherein said speed reduction mechanical drive means comprises a data film capstan in surface contact with said microfilm and driven thereby and an index film capstan in surface contact with the index film and driving the same, and a gear transmission system directly coupling said capstans such that said data microfilm capstan directly drives the index film capstan.

3. The microfilm viewer as claimed in claim 2, wherein at least one of said films includes sprocket holes therein and the capstan in peripheral contact therewith carries sprocket teeth in engagement with said sprocket holes such that said film moves at the same speed as the periphery of the capstan.

4. The microfilm viewer as claimed in claim 2, wherein said film is in frictional engagement with the capstan and said microfilm viewer further comprises a spring biased pinch roller mounted adjacent said capstan which presses the film against the capstan to insure frictional drive therebetween.

5. In a microfilm viewer or the like including: a microfilm supply reel, a microfilm take up reel, means for rotatably mounting said reels at spaced apart locations, a microfilm coupled at respective ends to said supply reel and said take up reel and reelable therebetween, motor means for selectively driving said reels to effect microfilm movement bidirectionally between said reels, the improvement comprising:
    a data film capstan mounted on a shaft for rotation about an axis parallel to the axis of said reels and in periheral engagement with said mircofilm at a point intermediate of said reels,
    an index film mounted within said viewer for movement, said index film carrying an index data corresponding to the microfilm data and adapted for viewing during movement of said index film,
    an index film capstan mounted on a shaft for rotation about its axis and in peripheral contact with said index film for driving said film, and
    geared transmission shaft means mechanically coupling the shaft of said data film capstan and that of said index film capstan for rotation of said index film at a slower speed than that of said data film;
    whereby, energization of said motor means and movement of said data microfilm causes said data microfilm to directly drive through said gear transmission shaft means, said index film capstan and said index film in contact therewith at a speed permitting the index data to be visibly read from said moving index film during microfilm movement.

6. The microfilm viewer as claimed in claim 5, wherein both said data microfilm and said index film include at least one series of longitudinally spaced sprocket holes and said capstans carry on their peripheries sprocket teeth at corresponding locations for engagement with said sprocket holes; whereby, said data microfilm positively rotates said data film sprocket, and said index sprocket positively drives said index film.

* * * * *